Nov. 11, 1930.  A. H. WADELL  1,781,355
CLAMP FOR SEATING BRAKE LININGS
Filed Dec. 18, 1928   2 Sheets-Sheet 1
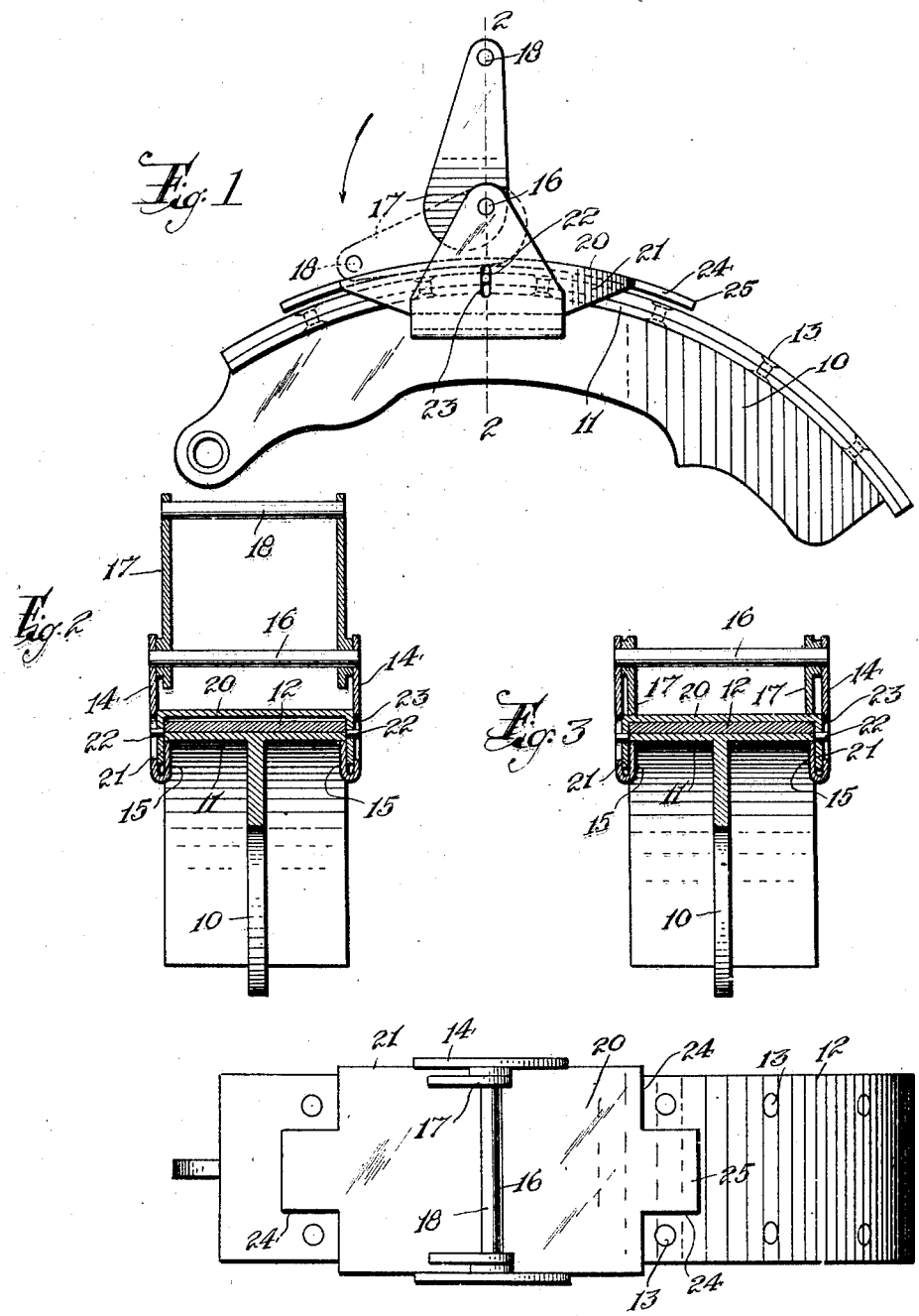

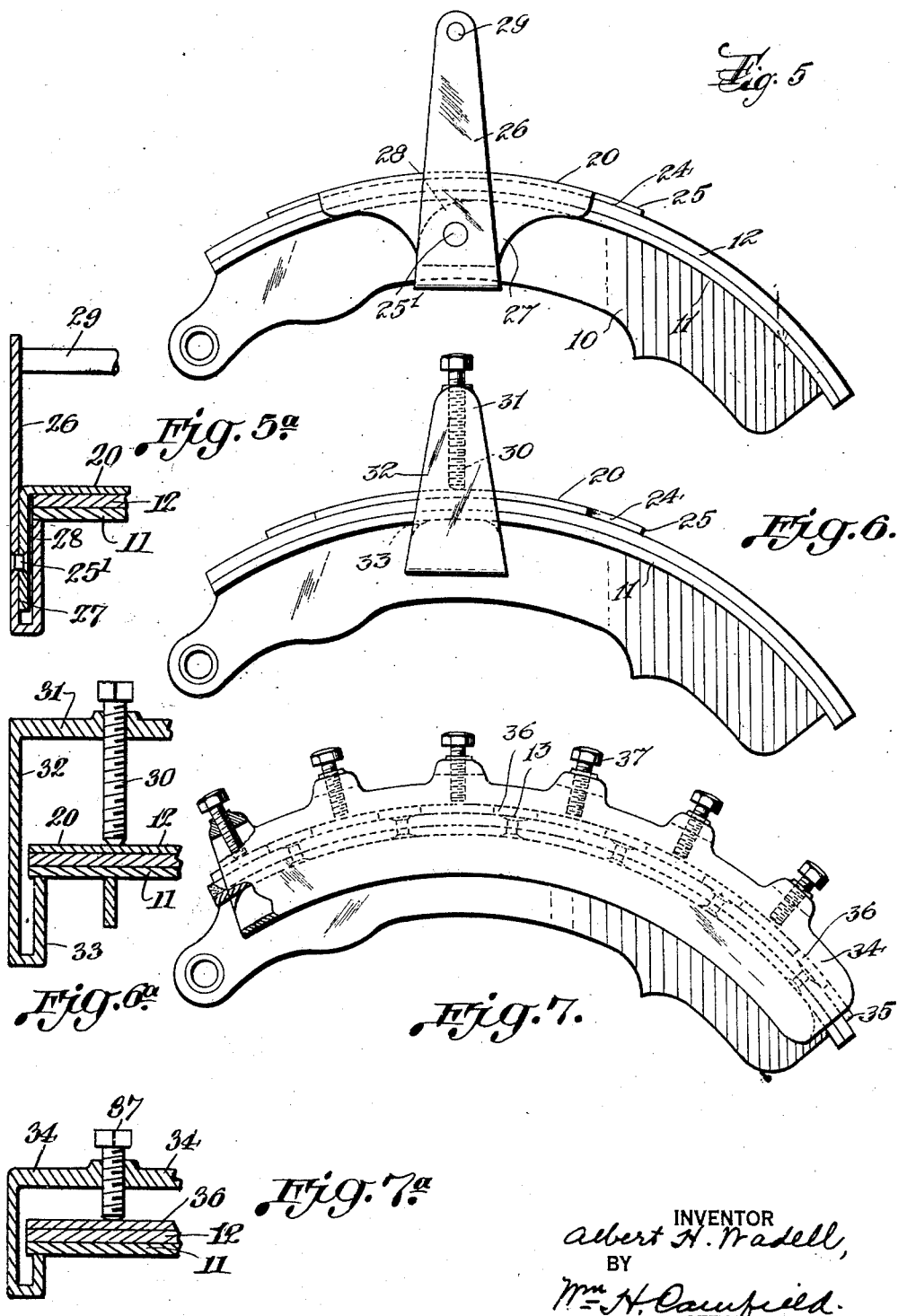

Patented Nov. 11, 1930

1,781,355

UNITED STATES PATENT OFFICE

ALBERT H. WADELL, OF NEWARK, NEW JERSEY

CLAMP FOR SEATING BRAKE LININGS

Application filed December 18, 1928. Serial No. 326,762.

This invention relates to an improved clamp for holding brake linings on brake shoes while the linings are being fastened in place by riveting. The brakes function properly only when the brake linings are flat on the shoes, that is, when there are no bulged parts or wrinkles. This invention holds the lining absolutely tight against the brake shoe and is removed after the lining is secured. The device is readily installed on and removed from the brake shoe.

The invention is illustrated in the accompanying drawings in which Figure 1 is a side view of a form of my improved clamp. Figure 2 is a section on line 2—2 in Figure 1 and Figure 3 is a similar view with the clamp in holding position. Figure 4 is a top view of the device shown in Figure 1. Figure 5 is a side view of a modified form. Figure 5ª is a central cross-section of the construction shown in Figure 5 and showing one-half thereof. Figure 6 is a side view of another modification. Fig. 6ª is a partial vertical section of Figure 6. Figure 7 is a side view of still another modified form of clamp. Figure 7ª is cross section of the form shown in Figure 7.

In the drawing the brake shoe 10 is of the usual form with the plate 11 over which the brake lining 12 is fastened. The fastening is usually done by means of rivets 13.

In the form shown in Figures 1 to 4, one member comprises side plates 14 which have inwardly extending portions 15 that bear on the under side of the flange 11 of the brake shoe when the device is in position. The side pieces 14 are connected by a bar 16 on which is mounted a cam 17, this cam being arranged to swing on the bar 16 and is provided with a suitable handle such as the cross arm 18. Spanning or bridging the space between the cross arms is a member consisting of a plate 20 which has flanges 21 that ride in a space provided between the arm 14 and the flange 15 on each side. Pins 22 in the slots 23 prevent longitudinal displacement of the members relative to each other.

The member 20 is arcuate to press evenly on the surface of the brake lining 12 and the plate 20 is cut away as at 24 so as to allow a space on either side of the lip 25, these giving access to allow the rivets 13 to be inserted and headed.

When the device is used it is slid on one end of the brake shoe and clamped into position. Suitable perforations are made and then the rivets 13 are secured in place. The clamp is then released and slid along to the next space to be fastened and the next series of rivets put in. This is repeated until the whole length of the brake lining has been transversed, then the clamp is released by releasing the cam 17 from the member 20 and the device is removed from the brake shoe.

In the form shown in Figure 5 the arcuate member 20 is provided with pins 25' on each side and the other member comprises side pieces 26 which are bent over and then up on the inner side of the ears 27 of the member 20 and these have the cam surfaces 28 which bear on the under side of the flange 11 of the brake shoe. The member 26 is swung on the pivots 25' by means of a suitable handle such as the rod 29 which also serves to connect and brace the two side arms 26. In the form shown in Figure 6 the arcuate member 20 is pressed down by a screw 30 which passes through and is in screw-threaded engagement with the cross bar 31 of the side arms 32 which have a folded over part at the bottom which bears as at 33 on the under side of the flange 11 of the brake shoe.

In Figure 7 I show a modification in which the two members 34 and 35 are both arcuate and are long enough to extend over the whole length of the brake lining. The member 35 is cut away as at 36 at intervals to allow the rivets 13 to be inserted and headed. Screws 37 are used to tightly clamp the brake lining to the brake shoe and these eliminate any uneven surfaces or wrinkles that might otherwise be present in the brake lining.

It will be evident that other changes can be made in the construction of the device without departing from the scope of the invention which is a clamp to insure that the brake lining conforms to the curvature of the brake shoe when it is fastened in place.

I claim:—

1. A clamp for seating brake linings comprising a pair of members one of which is arcuate, means for moving the members toward each other to clamp lining to a brake shoe, one of said members being cut away to expose a brake lining for riveting.

2. A clamp for seating brake linings comprising a pair of members, one member having inwardly extending edges, the second member being arcuate and bridging the space above said edges, and means for pressing the members toward each other.

3. A clamp for seating brake linings comprising an arcuate member, a second member having inwardly turned edges at the bottom and upwardly extending arms, and a cam secured to one of said arms and placed so that it bears on the arcuate member.

4. A clamp for seating brake linings comprising an arcuate member, a second member having inwardly turned edges at the bottom and upwardly extending arms, and a cam secured to one of said arms and placed so that it bears on the arcuate member the arcuate member having portions cut away to expose parts of a brake lining held thereby for riveting.

In testimony whereof I affix my signature.

ALBERT H. WADELL.